(12) United States Patent
Grois et al.

(10) Patent No.: US 11,800,156 B2
(45) Date of Patent: *Oct. 24, 2023

(54) METHODS, SYSTEMS, AND APPARATUSES FOR PROCESSING VIDEO BY ADAPTIVE RATE DISTORTION OPTIMIZATION

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/663,477

(22) Filed: May 16, 2022

(65) Prior Publication Data

US 2022/0385950 A1 Dec. 1, 2022

Related U.S. Application Data

(63) Continuation of application No. 16/836,271, filed on Mar. 31, 2020, now Pat. No. 11,363,306.
(Continued)

(51) Int. Cl.
*H04N 11/02* (2006.01)
*H04N 19/96* (2014.01)
(Continued)

(52) U.S. Cl.
CPC .......... *H04N 19/96* (2014.11); *H04N 19/177* (2014.11); *H04N 19/184* (2014.11)

(58) Field of Classification Search
CPC .................................................. H04N 19/96
(Continued)

(56) References Cited

U.S. PATENT DOCUMENTS 6,690,422 B1* 2/2004 Daly ............... H04N 23/84
348/E9.01
9,204,150 B2* 12/2015 Choi ............... H04N 17/004
(Continued)

OTHER PUBLICATIONS

Bauermann I et al: "RDTC Optimized Compression of Image-Based Scene Representations (Part I): Modeling and Theoretical Analysis", IEEE Transactions on Image Processing, IEEE Service Center, Piscataway, NJ, US, vol. 17, No. 5, May 1, 2008 (May 1, 2008), pp. 709-723, XP011205807.
(Continued)

*Primary Examiner* — Leron Beck
(74) *Attorney, Agent, or Firm* — BakerHostetler (57) ABSTRACT

Systems and methods are described herein for processing video. An encoder implementing the systems and methods described herein may receive video data comprising a plurality of frames and may partition each frame of the plurality of frames into a plurality of coding units. The encoder may then partition a coding unit into two or more prediction units. The encoder may determine, based on one or more coding parameters, a target bit rate, and characteristics of a human visual system (HVS), a coding mode for each of the two or more prediction units to minimize distortion in the encoded bitstream. The encoder may then determine a residual signal comprising a difference between each of the two or more prediction units and each of one or more corresponding prediction areas in a previously encoded frame and then generate an encoded bitstream comprising the residual signal.

20 Claims, 4 Drawing Sheets

Related U.S. Application Data (60) Provisional application No. 62/830,114, filed on Apr. 5, 2019.

(51) Int. Cl.
   *H04N 19/177* (2014.01)
   *H04N 19/184* (2014.01)

(58) Field of Classification Search
   USPC .................................. 375/240.01–240.29
   See application file for complete search history.

(56) References Cited

U.S. PATENT DOCUMENTS

| | | | |
|---|---|---|---|
| 10,623,774 B2* | 4/2020 | Zhao | H04N 19/61 |
| 10,771,781 B2* | 9/2020 | Lee | H04N 19/105 |
| 2010/0278275 A1 | 11/2010 | Yang et al. | |
| 2010/0329342 A1* | 12/2010 | Joshi | H04N 19/61 |
| | | | 375/E7.125 |
| 2011/0170591 A1* | 7/2011 | Li | H04N 19/172 |
| | | | 375/240.01 |
| 2012/0170648 A1* | 7/2012 | Chen | H04N 19/70 |
| | | | 375/240.03 |
| 2012/0170650 A1* | 7/2012 | Chong | H04N 19/117 |
| | | | 375/E7.243 |
| 2013/0058395 A1 | 3/2013 | Nilsson et al. | |
| 2014/0064373 A1* | 3/2014 | Le Leannec | H04N 19/176 |
| | | | 375/240.12 |
| 2014/0092982 A1* | 4/2014 | Panusopone | H04N 19/30 |
| | | | 375/240.18 |
| 2014/0254670 A1* | 9/2014 | Kwon | H04N 19/157 |
| | | | 375/240.12 |
| 2014/0376625 A1* | 12/2014 | Lee | H04N 19/147 |
| | | | 375/240.12 |
| 2015/0016521 A1* | 1/2015 | Peng | H04N 19/119 |
| | | | 375/240.12 |
| 2015/0055697 A1* | 2/2015 | Wu | H04N 19/147 |
| | | | 375/240.02 |
| 2016/0212427 A1* | 7/2016 | Yoneoka | H04N 19/176 |
| 2016/0212438 A1* | 7/2016 | Andersson | H04N 19/33 |
| 2016/0337668 A1* | 11/2016 | Le Leannec | H04N 19/98 |
| 2017/0070745 A1 | 3/2017 | Park et al. | |
| 2017/0374390 A1* | 12/2017 | Leleannec | H04N 19/147 |
| 2018/0262758 A1* | 9/2018 | El-Ghoroury | H04N 13/344 |
| 2018/0262777 A1* | 9/2018 | Filippov | H04N 19/12 |

OTHER PUBLICATIONS

Bichon Maxime et al: "Low Complexity Joint RDO of Prediction Units Couples for HEVC Intra Coding", 2018 IEEE International Conference on Acoustics, Speech and Signal Processing (ICASSP), IEEE, Apr. 15, 2018 (Apr. 15, 2018), pp. 1733-1737, XP033401753.
US Patent Application filed on Mar. 31, 2020, entitled "Methods, Systems, and Apparatuses for Processing Video by Adaptive Rate Distortion Optimization", U.S. Appl. No. 16/836,271.

* cited by examiner

METHODS, SYSTEMS, AND APPARATUSES FOR PROCESSING VIDEO BY ADAPTIVE RATE DISTORTION OPTIMIZATION

CROSS REFERENCE TO RELATED APPLICATIONS

This application is a continuation application of U.S. application Ser. No. 16/836,271, filed Mar. 31, 2020, now U.S. Pat. No. 11,363,306, issued on Jun. 14, 2022, which claims the benefit of U.S. Provisional Patent Application No. 62/830,114, filed Apr. 5, 2019, the contents of which are incorporated by reference in their entirety as if fully set forth herein.

BACKGROUND

The first version of the High Efficiency Video Coding (HEVC) standard was officially approved in 2013. HEVC enables more efficient compression of high-resolution video content, such as 3840×2160 resolutions (e.g., 4K resolution) in terms of luma samples, compared to the preceding standards (e.g., H.264/MPEG-AVC). HEVC provides a good trade-off between the content visual quality and its corresponding bit-rate.

The next generation video coding standard, Versatile Video Coding (VVC) standard has officially started. The VVC standard is being developed with the ultra high-definition, Ultra HD, and high frame rate video requirements in mind (such as 7680×4320 (8K resolution)). However, the average computational complexity of VVC is expected to be several times higher than of its predecessor, HEVC.

There is currently a strong need to reduce a bit-rate, especially for the high-resolution video content, without decreasing perceived video content quality, and further keeping computational complexity at a reasonable level.

SUMMARY

Systems and methods are described herein for processing video. An encoder implementing the systems and methods described herein may receive video data comprising a plurality of frames and may partition each frame of the plurality of frames into a plurality of coding units. The encoder may then partition a coding unit into two or more prediction units. The encoder may determine, based on one or more coding parameters, a target bit rate, and characteristics of a human visual system (HVS), a coding mode for each of the two or more prediction units to minimize distortion in the encoded bitstream. The encoder may then determine a residual signal comprising a difference between each of the two or more prediction units and each of one or more corresponding prediction areas in a previously encoded frame and then generate an encoded bitstream comprising the residual signal.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Systems and methods are described herein for processing video. Video content may comprise video frames or other images. Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The video may be processed by a video codec comprising an encoder and decoder. When video is transmitted from one location to another, the encoder may encode the video (e.g., into a compressed format) using a compression technique prior to transmission. The decoder may receive the compressed video and decode the video (e.g., into a decompressed format).

An encoder implementing the systems and methods described herein may receive video data comprising a plurality of frames and may partition each frame of the plurality of frames into a plurality of coding units or coding blocks. The encoder may then partition a coding unit into two or more prediction units. The encoder may determine, based on one or more coding parameters and a target bit rate, a coding mode for each of the two or more prediction units to minimize distortion in the encoded bitstream. The determination may also be based on characteristics of a human visual system (HVS). The encoder may then determine a residual signal comprising a difference between each of the two or more prediction units and each of one or more corresponding prediction areas in a previously encoded frame and then generate an encoded bitstream comprising the residual signal.

The encoder implementing the systems and methods described herein reduces video bit-rate substantially without decreasing video content quality by employing adaptive rate distortion optimization during the encoding stage. The video may comprise High Dynamic Range (HDR) or Standard Dynamic Range (SDR) video content. The encoder implementing the systems and methods described herein may be based on any block-based hybrid video coding standards, including but not limited to H.264/MPEG-AVC, H.265/MPEG-HEVC, or VVC. For exemplary purposes, the examples described herein may apply terminology from any of these standards.

The H.265/MPEG-HEVC standard is considered to be much more comprehensive that its predecessor H.264/MPEG-AVC. HEVC enables partitioning of each video frame into a plurality of square-shaped coding tree blocks (CTBs). A CTB is the basic processing unit of HEVC. CTBs may be partitioned into variable sizes, e.g., 16×16 pixels, 32×32 pixels, or 64×64 pixel samples. Along with the associated syntax elements, one luma CTB and two corresponding chroma CTBs form a coding tree unit (CTU). A CTU as described herein is analogous to a macroblock (e.g., as used in the H.264/MPEG-AVC standard. Generally, larger CTU sizes result in better coding efficiency at high resolutions. However, this may result in a noticeable increase in computational complexity. A hierarchical quadtree partitioning structure used by HEVC, splits a CTU into one or more coding units (CUs) of variable sizes, between 8×8 pixels and 64×64 pixels.

The encoder may generate a prediction of each current CU based on previously encoded data. The prediction may comprise intra-picture (spatial) prediction, which is based on previously encoded data of the current frame being encoded. The prediction may comprise inter-picture (temporal motion-compensated) prediction, which is based on previously encoded data of a previously encoded reference frame. The type of prediction used by the encoder may be referred to as a coding mode.

For both the intra-picture (spatial) and inter-picture (temporal motion-compensated) prediction, each CU may be further subdivided into smaller blocks along the coding tree boundaries. As a result, at least one prediction unit (PU) is determined for each CU in order to provide the best matching prediction data, while the selected coding mode indicates whether the CU (comprising a single luma coding block (CB) and two chroma CBs) has been coded using the intra-picture or inter-picture prediction. A PU as described herein is analogous to a prediction area (e.g., as used in the H.264/MPEG-AVC standard.

The encoder may generate a residual signal by determining a difference between the PU and a prediction area in a previously encoded frame. The residual signals may then be transformed using, for example, a discrete cosine transform (DCT), which may generate coefficients associated with the residuals. The encoder may then perform a quantization process to quantize the coefficients. Further, for transform coding of the prediction residuals, each CB may be partitioned into multiple transform blocks (TBs), the size of which may also vary from 4×4 pixels to 32×32 pixels. As a result, each CTB may be viewed as a root node of two trees: the coding tree, while the coding block (i.e. the leaf of the coding tree) is a root of the second tree, the transform tree or the residual quadtree (RQT).

The compressed bitstream may then be transmitted by the encoder. The transmitted compressed bitstream may comprise the quantized coefficients and information to enable the decoder to regenerate the PUs, such as motion vector associated with the motion compensation. The decoder may receive the compressed bitstream and may decode the compressed bitstream to regenerate the video content.

In the encoding process described above, the encoder has to make many "decisions" regarding the video frame partitioning in order to achieve an optimal coding gain as a function of an estimated distortion (e.g., make decisions regarding optimal CU sizes, the optimal number of CU splits, etc.). Such a decision process is referred to as Rate-Distortion Optimization (RDO), the purpose of which is to select the best coding mode that leads to the smallest distortion for a given/target bit-rate.

Generally, for performing the above-mentioned best coding mode selection, the following cost function J should be minimized:

$$\min\{J(D,R)\} = D + \lambda * R \qquad \text{Equation (1)}$$

where D is the distortion, R is the cost (in bits) to encode the decision, and is the so called Lagrangian multiplier, which is conventionally determined in an empirical manner. It should be noted that generally, the cost function J is evaluated for all possible coding modes (including intra-picture prediction modes, inter-picture prediction modes, etc.) to determine the best mode in terms of rate-distortion.

In HEVC, is a function of a quantization parameter (QP), thereby depending on a target compression rate without considering either subjective visual quality or any perceptual aspects of the coded video. As a result, there is a disconnect between the target video compression rate and the actual visual quality to be perceived by the end user based on the Human Visual System (HVS). This issue is even more critical for the VVC standard due to its relatively large CTU sizes of 128×128 pixels (instead of the 64×64 pixels of HEVC), each of which can be split into a plurality of varying-size CUs to determine the best coding mode.

In addition, the above-mentioned calculation of the cost function J is optimal only in the case where there are no dependences between PUs. However, practically, such dependences exist due to the nature of the predictive coding (i.e. intra/inter-picture coding), and the nature of other coding tools within the conventional block-based hybrid encoding loop, such as the Context Adaptive Binary Arithmetic Coding (CABAC). Therefore, executing RDO separately for each PU, e.g., independently from other PUs, is not optimal.

According to one embodiment, to address the above-mentioned shortcomings, two or more PUs may be jointly considered during RDO. As a result, according to the present invention, the encoder may determine a solution of the following equation, which is more comprehensive and considers video content properties of each PU/CU in a more accurate manner:

$$\min\{J(D,R)\}_{N-1} = \Sigma_{i=0}^{N-1}[D(i|c_i) + \lambda * R(|c_i)] \qquad \text{Equation (2)}$$

where N is a number of PUs which have to be jointly considered during RDO and $c_i$ are coding parameters to be considered during RDO. The coding parameters may comprise a group of pictures (GOP) size or a search type. As a result, the decision made for selecting the best mode for one PU has a direct impact on the decision made for selecting the best mode for another PU, and so on. Such PUs, for example, may comprise consecutive PUs or PUs related to CUs belonging to the same CTU or belonging to a predefined number of consecutive/adjacent CTUs.

For example, Equation (1) does not take into account the change in distortion resulting from an optimal motion vector in a topmost and leftmost CTU, as later CTUs may use motion vectors from the former as predictors. This continued reuse may make this particular vector a cheaper option and may cause artefacts in cases of slow homogenous movement (e.g. "camera panning").

Another example includes minimizing error propagation. Given similar distortion (as SAD/SATD), a prediction block, which itself has minimal distortion vs its source, is preferred. For example, when a reference frame is encoded and added to the decoder picture buffer (DPB), the encoder will also maintain an dDPB ("distortion DPB") buffer maintaining distortion maps of each of the DPB frames. This distortion map may be a pixel-level difference map, which may be a map of absolute differences or may use more advanced techniques to arrive at pixel-level perceptual differences. Lower-complexity approximations techniques such as preferring lower-quantizer prediction blocks may also be used.

According to another embodiment, the RDO of the reference frame (or any portion of it) may be performed jointly. As described above, in video coding, reference frames are frames used for the inter-picture prediction purposes. By employing RDO as described herein, the reference frame (or any portion of it) may be optimally encoded, which in turn results in a significant coding gain due to a more accurate prediction as a trade-off of encoding computational complexity.

According to yet another embodiment, RDO may be performed for a predetermined (e.g., limited) set of all possible coding modes. Such a set may be predetermined based on the estimated computational complexity for various coding modes.

According to another embodiment, the Lagrangian multiplier λ may be determined based on the HVS properties/characteristics to optimize the video based on subjective quality perspectives, thereby making the video to be perceived in an optimal manner under given/target bit-rate constraints. The perceptual Lagrangian multiplier λ, i.e. $\lambda_{HVS}$, may vary from one PU/CU or CTU, based on the importance of the corresponding content (of that CTU) to the perceived visual/subjective quality. As a result, the perceptual Lagrangian multiplier $\lambda_{HVS}$, per PU/CU, CTU, or group of CTUs up to the size of the whole (reference) frame, may be determined as follows:

$$\lambda_{HVS} = \lambda * (1 - F_{HVS}) \qquad \text{Equation (3)}$$

where λ is the original Lagrangian multiplier that depends on QP only, and is predetermined in a conventional manner (e.g., empirically), and $F_{HVS}$ is a quality factor (having either a positive or negative value) based on the properties and characteristics of an HVS. Such characteristics include, for example, a Contrast Sensitivity Function (CSF) for a specific content type and specific viewing conditions (e.g., a display size, viewing distance, etc.), spatial resolution of the coded video content, amount and density of small/fine details within CU/CTU/frame, fast or slow motion, optical flow, etc. In addition, $F_{HVS}$ may be further adjusted to SDR or HDR, accordingly. As a result, the Lagrangian multiplier is adaptively determined in an optimal manner.

In the techniques described herein, the decoding process may remain as is, which enables these techniques to be transparently used by all existing codecs, thereby not requiring any change/update at the decoder end.

Figure 1:
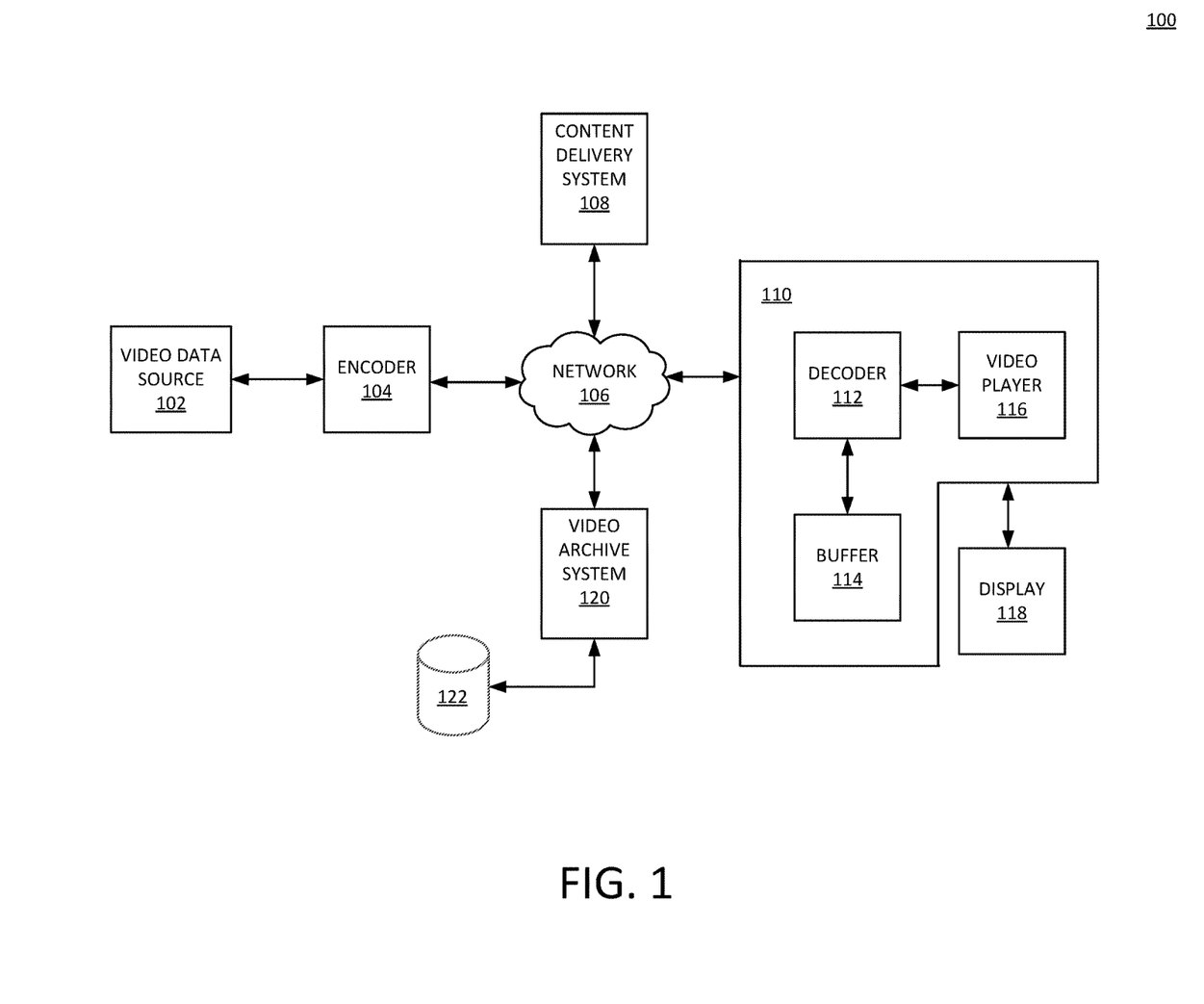
FIG. 1 shows an example system.

FIG. 1 shows system 100 configured for video processing. The system 100 may comprise a video data source 102, an encoder 104, a content delivery system 108, a computing device 110, and a video archive system 120. The video archive system 120 may be communicatively connected to a database 122 to store archived video data.

The video data source 102, the encoder 104, the content delivery system 108, the computing device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The video data source 102 may comprise a headend, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the computing device 110, the content delivery system 108, and/or the video archive system 120.

The content delivery system 108 may receive a request for video data from the computing device 110. The content delivery system 108 may authorize/authenticate the request and/or the computing device 110 from which the request originated. The request for video data may comprise a request for a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The encoder 104 may transmit the encoded video data to the requesting component, such as the content delivery system 108 or the computing device 110. The content delivery system 108 may transmit the requested encoded video data to the requesting computing device 110. The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a computing device 110 for the encoded video data. The video archive system 120 may provide the requested encoded video data to the computing device 110.

The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The computing device 110 (and/or the computing device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

Figure 2:
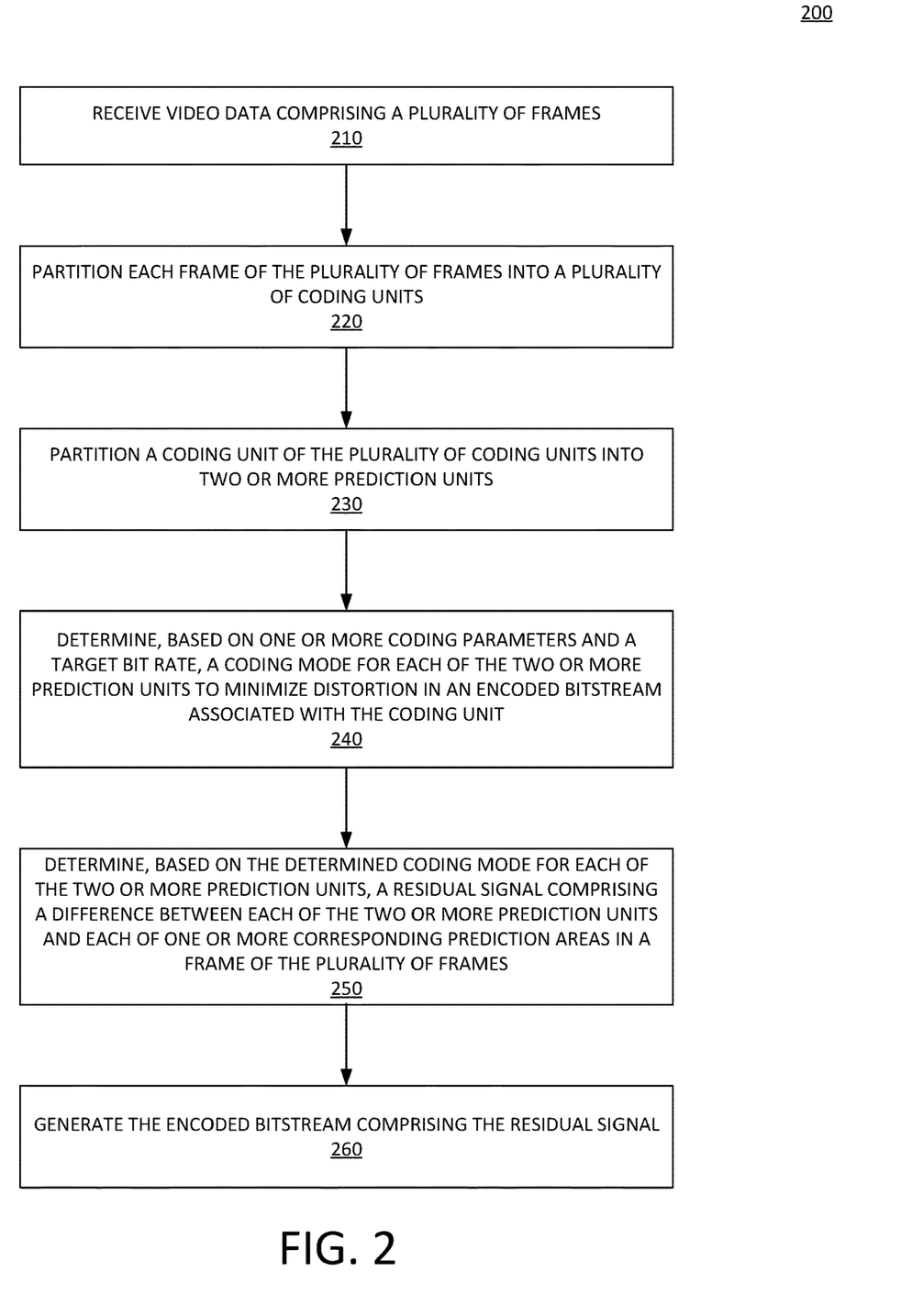
FIG. 2 shows an example method.

FIG. 2 shows an example method 200. The method 200 of FIG. 2, may be performed by the encoder 104 or computing device 110 of FIG. 1. At step 210, an encoder may receive video data comprising a plurality of frames. At step 220, the encoder may partition each frame of the plurality of frames into a plurality of coding units.

At step 230, the encoder may partition a coding unit of the plurality of coding units into two or more prediction units. The two or more prediction units may comprise consecutive prediction units or adjacent prediction units. Alternatively or additionally, the two or more prediction units may be associated with coding units of a same coding tree unit, with coding units of a predefined number of consecutive coding tree units, or with coding units of a predefined number of adjacent coding tree units. The two or more prediction units may form a whole reference frame.

At step 240, the encoder may determine, based on one or more coding parameters and a target bit rate, a coding mode for each of the two or more prediction units to minimize distortion in an encoded bitstream associated with the coding unit. The determining may comprise determining a solution to Equation (2) described above. The one or more coding parameters may comprise a GOP size or a search type. The determined coding mode for each of the two or more prediction units may belong to a set of predefined coding modes.

The encoder may receive information indicating characteristics of an HVS. The determining may further be based on Equation (3) described above, so that the HVS properties/characteristics may enable optimization of the video based on subjective quality perspectives/perceptual aspects. The determining the coding mode for each of the two or more prediction units may be further based on the HVS characteristics. The HVS characteristics may comprise a contrast sensitivity function for a content type and a viewing condition. The viewing condition may comprise a display size or a viewing distance. The HVS characteristics may comprise a spatial resolution of the video data. The HVS characteristics may comprise an amount and density of details within the coding unit. The HVS characteristics may comprise a speed of motion or optical flow.

At step 250, the encoder may determine, based on the determined coding mode for each of the two or more prediction units, a residual signal comprising a difference between each of the two or more prediction units and each of one or more corresponding prediction areas in a frame of the plurality of frames. At step 260, the encoder may generate the encoded bitstream comprising the residual signal. The generating may comprise generating a dDPB comprising information indicating a map of pixel differences between encoded frames in the encoded bitstream.

Figure 3:
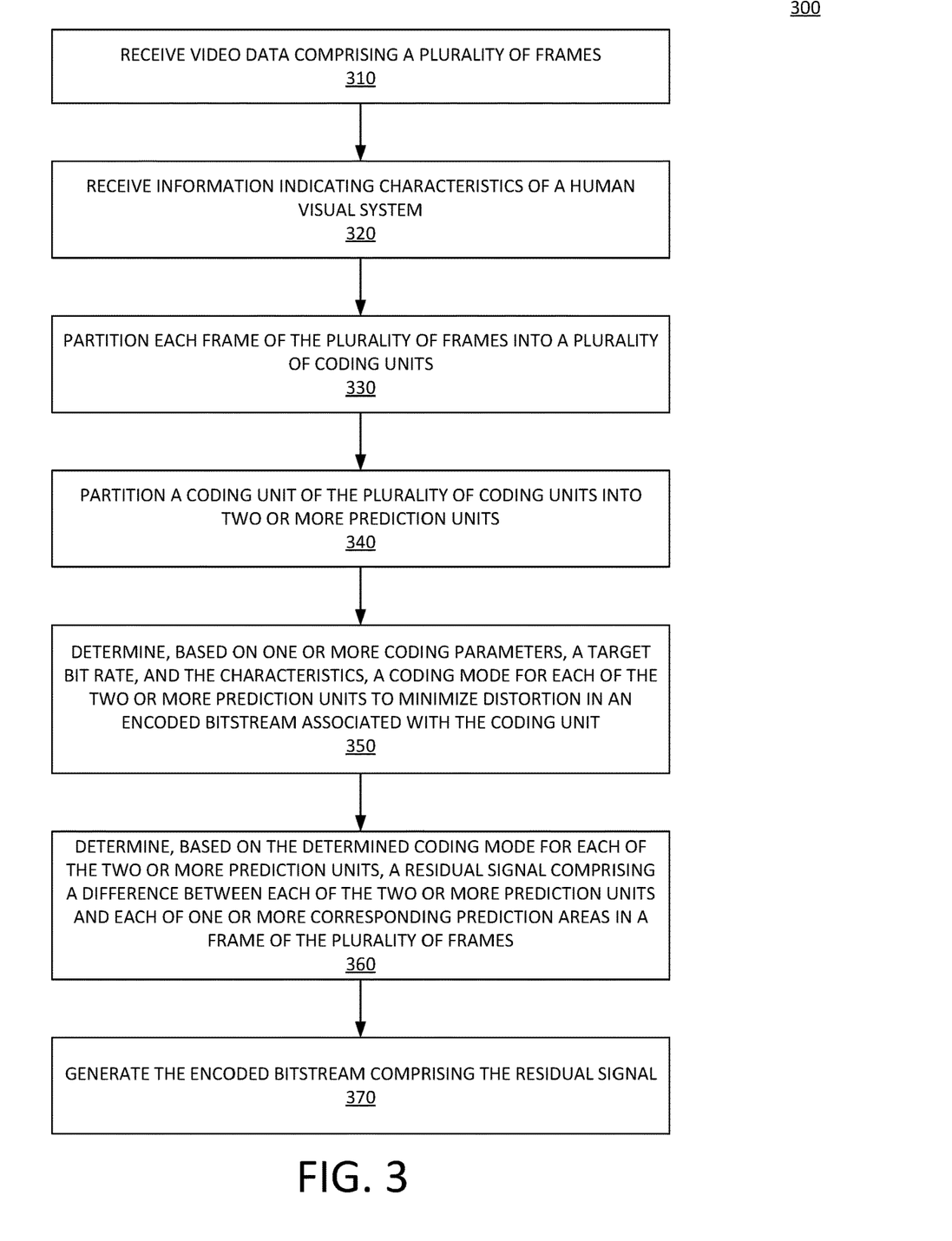
FIG. 3 shows an example method and
FIG. 4 depicts an example computing device.

FIG. 3 shows an example method 300. The method 300 of FIG. 3, may be performed by the encoder 104 or computing device 110 of FIG. 1. At step 310, an encoder may receive video data comprising a plurality of frames. At step 320, the encoder may receive information indicating characteristics of an HVS.

At step 330, the encoder may partition each frame of the plurality of frames into a plurality of coding units. At step 340, the encoder may partition a coding unit of the plurality of coding units into two or more prediction units. The two or more prediction units may comprise consecutive prediction units or adjacent prediction units. Alternatively or additionally, the two or more prediction units may be associated with coding units of a same coding tree unit, with coding units of a predefined number of consecutive coding tree units, or with coding units of a predefined number of adjacent coding tree units. The two or more prediction units may form a whole reference frame.

At step 350, the encoder may determine, based on one or more coding parameters, a target bit rate, and the characteristics, a coding mode for each of the two or more prediction units to minimize distortion in an encoded bitstream associated with the coding unit. The determining may comprise determining a solution to Equation (2) described above. The one or more coding parameters may comprise a GOP size or a search type. The determining may further be based on Equation (3) described above, so that the HVS properties/characteristics received in step 320 may enable optimization of the video based on subjective quality perspectives/perceptual aspects.

The determined coding mode for each of the two or more prediction units may belong to a set of predefined coding modes. The HVS characteristics may comprise a contrast sensitivity function for a content type and a viewing condition. The viewing condition may comprise a display size or a viewing distance. The HVS characteristics may comprise a spatial resolution of the video data. The HVS characteristics may comprise an amount and density of details within the coding unit. The HVS characteristics may comprise a speed of motion or optical flow.

At step 360, the encoder may determine, based on the determined coding mode for each of the two or more prediction units, a residual signal comprising a difference between each of the two or more prediction units and each of one or more corresponding prediction areas in a frame of the plurality of frames. At step 370, the encoder may generate the encoded bitstream comprising the residual signal. The generating may comprise generating a dDPB comprising information indicating a map of pixel differences between encoded frames in the encoded bitstream.

Figure 4:
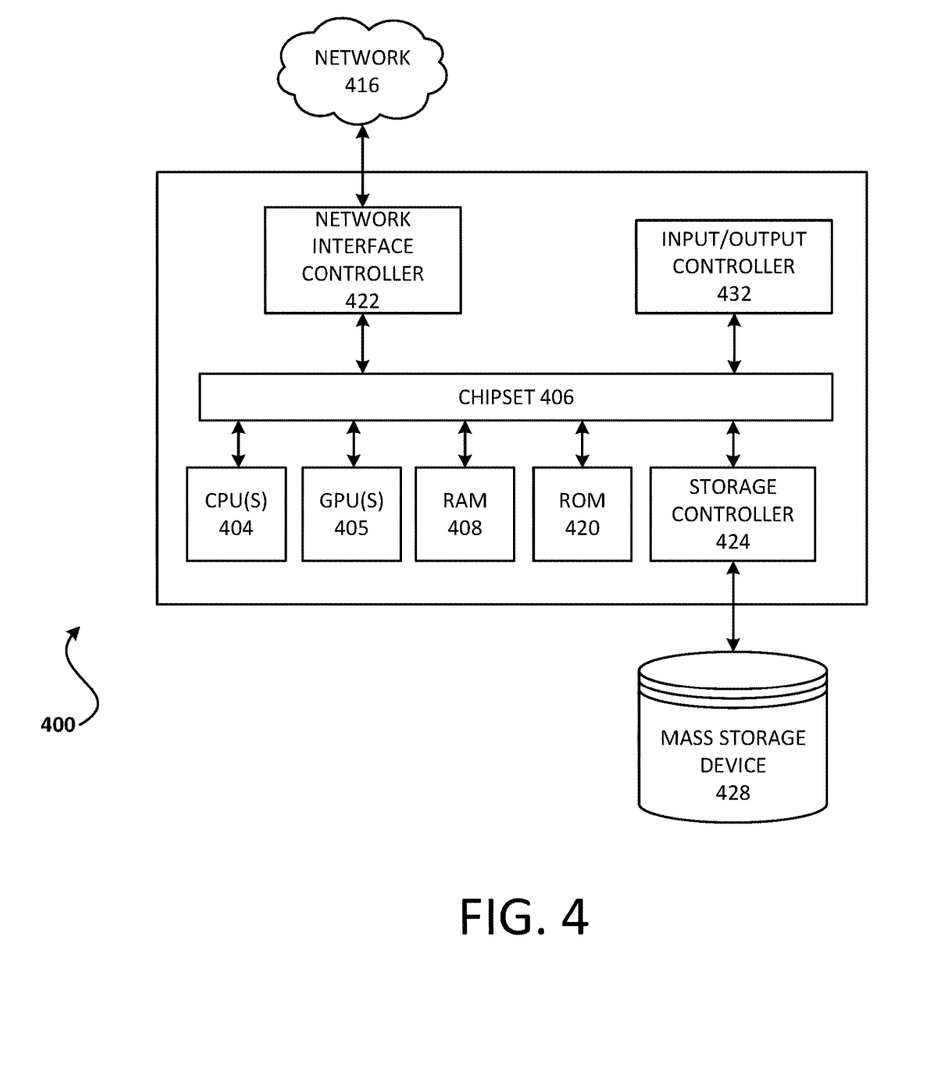

FIG. 4 depicts a computing device 400 that may be used in various aspects, such as the servers, modules, and/or devices depicted in FIG. 1. With regard to the example architectures of FIG. 1, the devices may each be implemented in an instance of a computing device 400 of FIG. 4. The computer architecture shown in FIG. 4 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-3.

The computing device 400 may include a baseboard, or "motherboard," which is a printed circuit board to which a multitude of components or devices may be connected by way of a system bus or other electrical communication paths. One or more central processing units (CPUs) 404 may operate in conjunction with a chipset 406. The CPU(s) 404 may be standard programmable processors that perform arithmetic and logical operations necessary for the operation of the computing device 400.

The CPU(s) 404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 404 may be augmented with or replaced by other processing units, such as GPU(s) 405. The GPU(s) 405 may comprise processing units specialized for but not necessarily limited to highly parallel computations, such as graphics and other visualization-related processing.

A chipset 406 may provide an interface between the CPU(s) 404 and the remainder of the components and devices on the baseboard. The chipset 406 may provide an interface to a random access memory (RAM) 408 used as the main memory in the computing device 400. The chipset 406 may further provide an interface to a computer-readable storage medium, such as a read-only memory (ROM) 420 or non-volatile RAM (NVRAM) (not shown), for storing basic routines that may help to start up the computing device 400 and to transfer information between the various components and devices. ROM 420 or NVRAM may also store other software components necessary for the operation of the computing device 400 in accordance with the aspects described herein.

The computing device 400 may operate in a networked environment using logical connections to remote computing nodes and computer systems through local area network (LAN) 416. The chipset 406 may include functionality for providing network connectivity through a network interface controller (NIC) 422, such as a gigabit Ethernet adapter. A NIC 422 may be capable of connecting the computing device 400 to other computing nodes over a network 416. It should be appreciated that multiple NICs 422 may be present in the computing device 400, connecting the computing device to other types of networks and remote computer systems.

The computing device 400 may be connected to a mass storage device 428 that provides non-volatile storage for the computer. The mass storage device 428 may store system programs, application programs, other program modules, and data, which have been described in greater detail herein. The mass storage device 428 may be connected to the computing device 400 through a storage controller 424 connected to the chipset 406. The mass storage device 428 may consist of one or more physical storage units. A storage controller 424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 400 may store data on a mass storage device 428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 428 is characterized as primary or secondary storage and the like.

For example, the computing device 400 may store information to the mass storage device 428 by issuing instructions through a storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may further read information from the mass storage device 428 by detecting the physical states or characteristics of one or more particular locations within the physical storage units.

In addition to the mass storage device 428 described herein, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 428 depicted in FIG. 4, may store an operating system utilized to control the operation of the computing device 400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 428 may store other system or application programs and data utilized by the computing device 400.

The mass storage device 428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described herein. The computing device 400 may have access to computer-readable storage media storing computer-executable instructions, which, when executed by the computing device 400, may perform the methods described in relation to FIGS. 2-3.

A computing device, such as the computing device 400 depicted in FIG. 4, may also include an input/output controller 432 for receiving and processing input from a number of input devices, such as a keyboard, a mouse, a touchpad, a touch screen, an electronic stylus, or other type of input device. Similarly, an input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing device may be a physical computing device, such as the computing device 400 of FIG. 4. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
receiving video data associated with one or more frames, wherein the video data comprises two or more prediction units partitioned from a coding unit that was partitioned from a frame of the one or more frames;
determining, jointly, for at least each of the two or more prediction units, a coding mode that minimizes distortion in an encoded bitstream associated with the coding unit;
determining, based on the determined coding mode, a residual signal comprising a difference between at least each of the two or more prediction units and at least each of one or more corresponding prediction areas in the frame; and
causing output of the encoded bitstream comprising the residual signal.

2. The method of claim 1, wherein the causing output comprises generating a distortion decoder picture buffer comprising information indicating a map of pixel differences between encoded frames in the encoded bitstream.

3. The method of claim 1, wherein the determining, jointly, for at least each of the two or more prediction units, the coding mode, is further based on information indicating characteristics of a human visual system.

4. The method of claim 3, wherein the encoded bitstream is based on the characteristics of the human visual system.

5. The method of claim 3, wherein the characteristics of the human visual system comprise at least one of: a contrast sensitivity function for a content type, a viewing condition, a spatial resolution of the video data, an amount and density of details within the coding unit, or a speed of motion or optical flow, wherein the viewing condition comprises a display size or a viewing distance.

6. The method of claim 1, wherein the determining, jointly for at least each of the two or more prediction units, the coding mode comprises:
minimizing a cost function based on the two or more prediction units.

7. The method of claim 6, wherein the cost function further comprises a Lagrangian multiplier determined based on information indicating characteristics of a human visual system.

8. A non-transitory computer-readable storage medium storing computer-readable instructions that, when executed by a processor, cause:
receiving video data associated with one or more frames, wherein the video data comprises two or more prediction units partitioned from a coding unit that was partitioned from a frame of the one or more frames;
determining, jointly, for at least each of the two or more prediction units, a coding mode that minimizes distortion in an encoded bitstream associated with the coding unit;
determining, based on the determined coding mode, a residual signal comprising a difference between at least each of the two or more prediction units and at least each of one or more corresponding prediction areas in the frame; and
causing output of the encoded bitstream comprising the residual signal.

9. The non-transitory computer-readable storage medium of claim 8, wherein the causing output comprises generating a distortion decoder picture buffer comprising information indicating a map of pixel differences between encoded frames in the encoded bitstream.

10. The non-transitory computer-readable storage medium of claim 8, wherein the determining, jointly, for at least each of the two or more prediction units, the coding mode, is further based on information indicating characteristics of a human visual system.

11. The non-transitory computer-readable storage medium of claim 10, wherein the encoded bitstream is based on the characteristics of the human visual system.

12. The non-transitory computer-readable storage medium of claim 10, wherein the characteristics of the human visual system comprise at least one of: a contrast sensitivity function for a content type, a viewing condition, a spatial resolution of the video data, an amount and density of details within the coding unit, or a speed of motion or optical flow, wherein the viewing condition comprises a display size or a viewing distance.

13. The non-transitory computer-readable storage medium of claim 8, wherein the determining, jointly for at least each of the two or more prediction units, the coding mode comprises:
minimizing a cost function based on the two or more prediction units.

14. The non-transitory computer-readable storage medium of claim 13, wherein the cost function further comprises a Lagrangian multiplier determined based on information indicating characteristics of a human visual system.

15. A system comprising:
a first computing device configured to:
receive video data associated with one or more frames, wherein the video data comprises two or more prediction units partitioned from a coding unit that was partitioned from a frame of the one or more frames, determine, jointly, for at least each of the two or more prediction units, a coding mode that minimizes distortion in an encoded bitstream associated with the coding unit, determine, based on the determined coding mode, a residual signal comprising a difference between at least each of the two or more prediction units and at least each of one or more corresponding prediction areas in the frame, and cause output of the encoded bitstream comprising the residual signal; and a second computing device configured to:

decode the encoded bitstream.

16. The system of claim 15, wherein the determining, jointly, for at least each of the two or more prediction units, the coding mode, is further based on information indicating characteristics of a human visual system.

17. The system of claim 16, wherein the encoded bitstream is based on the characteristics of the human visual system.

18. The system of claim 16, wherein the characteristics of the human visual system comprise at least one of: a contrast sensitivity function for a content type, a viewing condition, a spatial resolution of the video data, an amount and density of details within the coding unit, or a speed of motion or optical flow, wherein the viewing condition comprises a display size or a viewing distance.

19. The system of claim 15, wherein the determining, jointly for at least each of the two or more prediction units, the coding mode comprises:

minimizing a cost function based on the two or more prediction units.

20. The system of claim 19, wherein the cost function further comprises a Lagrangian multiplier determined based on information indicating characteristics of a human visual system.

* * * * *